US008169998B2

(12) United States Patent
Fischer et al.

(10) Patent No.: US 8,169,998 B2
(45) Date of Patent: May 1, 2012

(54) METHOD AND SYSTEM FOR AN AD HOC WIRELESS NETWORK WITH MASTER CONTROL OF NETWORK PARAMETERS

(75) Inventors: Matthew Fischer, Mountain View, CA (US); Christopher Hansen, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 909 days.

(21) Appl. No.: 11/845,377

(22) Filed: Aug. 27, 2007

(65) Prior Publication Data

US 2008/0151848 A1 Jun. 26, 2008

Related U.S. Application Data (60) Provisional application No. 60/871,324, filed on Dec. 21, 2006.

(51) Int. Cl.
*H04J 3/06* (2006.01)
(52) U.S. Cl. ........................ 370/350; 370/507; 370/509
(58) Field of Classification Search .................. 370/350, 370/509, 510, 511, 512, 513
See application file for complete search history.

(56) References Cited

U.S. PATENT DOCUMENTS

| 5,297,142 | A  | * | 3/1994  | Paggeot et al. ............... 370/461 |
| 6,574,266 | B1 |   | 6/2003  | Haartsen |
| 7,400,899 | B2 | * | 7/2008  | Shin et al. ...................... 455/522 |
| 7,656,831 | B2 | * | 2/2010  | Gao et al. ....................... 370/311 |
| 7,768,981 | B1 | * | 8/2010  | Donovan et al. ............... 370/338 |
| 2005/0286480 | A1 | * | 12/2005 | Akiyama ....................... 370/338 |
| 2007/0025313 | A1 | * | 2/2007  | Bhagwat et al. .............. 370/338 |
| 2007/0211679 | A1 | * | 9/2007  | Laroia et al. .................. 370/338 |
| 2007/0226530 | A1 | * | 9/2007  | Celinski et al. ............... 713/500 |

FOREIGN PATENT DOCUMENTS

| CN | 1371583    | 9/2002 |
| JP | 3597511 B2 | 9/2004 |
| KR | 2005-52490 | 12/2004 |
| KR | 2005-96839 | 10/2005 |

* cited by examiner

*Primary Examiner* — Marsha D Banks Harold
*Assistant Examiner* — Alvin A Zhu
(74) *Attorney, Agent, or Firm* — Garlick & Markison; Bruce E. Garlick (57) ABSTRACT

Aspects of a system for an ad hoc wireless network with master control of network parameters may include one or more circuits that enable generation of a beacon frame at a supervisory WLAN station wherein the generated beacon frame contains a supervisory role indication. The supervisory role indication enables the supervisory WLAN station to establish timing synchronization and network parameters that are utilized by a plurality of WLAN stations utilized for communicating within a wireless network. Aspects of the system may also include a WLAN station that enables communication via a wireless local area network by utilizing a timestamp value and network parameter values retrieved from a received beacon frame based on the presence of a supervisory role indication within the received beacon frame.

20 Claims, 4 Drawing Sheets

FIG. 4

METHOD AND SYSTEM FOR AN AD HOC WIRELESS NETWORK WITH MASTER CONTROL OF NETWORK PARAMETERS

CROSS-REFERENCE TO RELATED APPLICATIONS/INCORPORATION BY REFERENCE

This application makes reference to, claims priority to, and claims the benefit of U.S. Provisional Application Ser. No. 60/871,324, filed on Dec. 21, 2006, which is hereby incorporated herein by reference in its entirety.

FIELD OF THE INVENTION

Certain embodiments of the invention relate to communication networks. More specifically, certain embodiments of the invention relate to a method and system for an ad hoc wireless network with master control of network parameters.

BACKGROUND OF THE INVENTION

IEEE 802.11 describes a communication architecture, which may enable computing devices to communicate via wireless local area networks (WLANs). One of the building blocks for the WLAN is the basic service set (BSS). A BSS may comprise a plurality of computing devices, or stations (STA), which may communicate wirelessly via one or more RF channels within a coverage area. The span of a coverage area may be determined based on the distance over which a source STA may transmit data via an RF channel, which may be received by a destination STA.

An independent BSS (IBSS) refers to a BSS, which comprises a set of STAs, which may communicate with each over within the coverage area for the BSS. The IBSS is identified by a BSS identifier (BSSID) and a service set identifier (SSID). In an IBSS each STA may engage in direct communication with any of the other STAs within the IBSS. An IBSS may be referred to as an ad hoc network.

To facilitate communication within the IBSS, each STA may negotiate a set of network parameters to utilize when communicating with other STAs in the IBSS. These network parameters may include frequency spectrum management for RF channel assignment, determination of supported data rates and quality of service (QoS) parameters, for example. Each STA also attempts to synchronize its operations to a clock source, which is common to the STAs within the IBSS.

The negotiation of network parameters and timing synchronization among the STAB typically involves the exchange of beacon frames. At various time instants, one or more STAB within the IBSS may transmit a beacon frame. A transmitted beacon frame may be received by each of the other STAB within the IBSS. The beacon frame may contain information elements, which specify a set of network parameters and enable timing synchronization among the STAB. Each transmitted beacon frame contains a timestamp value, which is determined based on a timing synchronization function (TSF) executing within the STA that transmitted the beacon frame.

Since an STA may receive a plurality of beacon frames within a time interval, referred to as a nominal beacon window, the receiving STA determines which one, if any, of the received beacon frames is to be adopted. Upon receiving a beacon frame, the receiving STA compares the timestamp value contained within the received beacon frame, with a time value generated by the TSF. When the received timestamp value is greater than the time value generated by the TSF, the TSF time value is set to a value equal to the received timestamp value. In addition, the STA adopts the network parameters contained within the beacon frame. In this regard, the receiving STA time synchronizes to the TSF clock of the STA, which transmitted the beacon frame. In addition, the receiving STA will utilize network parameters contained within the beacon frame when communicating with other STAB within the IBSS.

When the received timestamp value is less than or equal to the time value generated by the TSF, the STA adopts neither the timestamp value or the network parameters contained within the received beacon frame. In this regard, the receiving STA determines to neither time synchronize to the STA, which transmitted the beacon frame, or to utilize network parameters contained within the beacon frame when communicating with other STAs within the BSS.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for an ad hoc wireless network with master control of network parameters, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for an ad hoc wireless network with master control of network parameters. Various embodiments of the invention comprise a method and a system by which a selected wireless station (STA), among a plurality of STAs in an independent basic service set) IBSS, may determine the network parameters utilized by each of the STAs within the IBSS. In addition, each of the STAs may time synchronize to the time values generated by the time synchronization function (TSF) executing within the selected STA. Various embodiments of the invention comprise a method by which the selected STA may be determined among the plurality of STAs within the IBSS.

Figure 1:
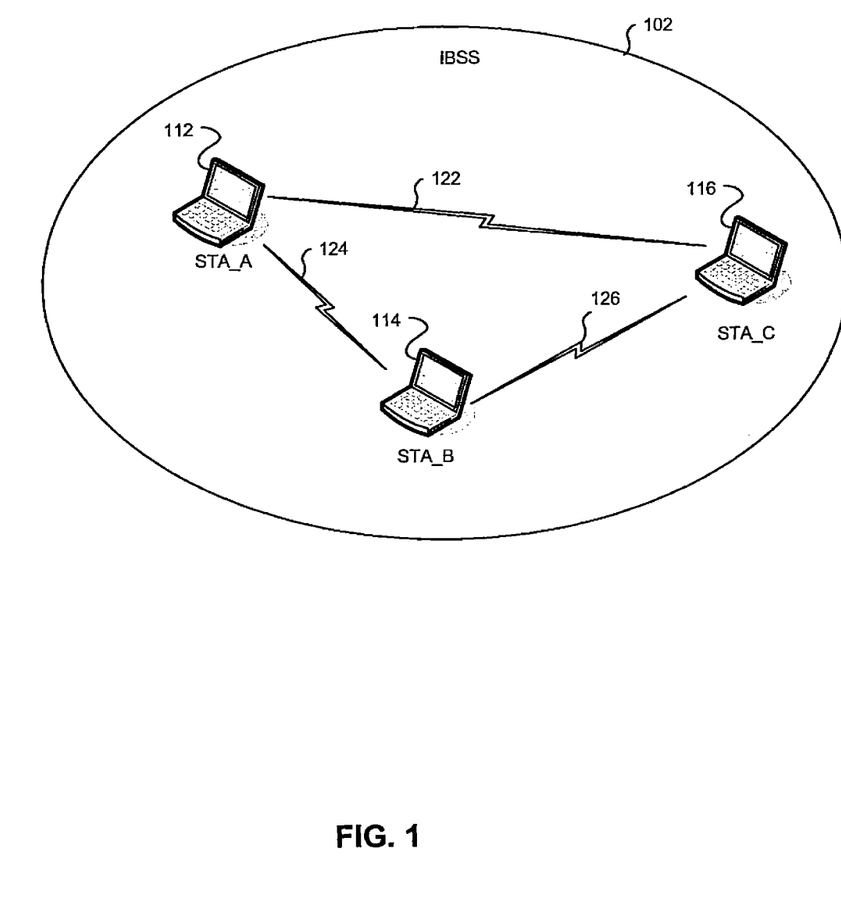
FIG. 1 is a block diagram of an exemplary system for wireless data communication, which may be utilized in an embodiment of the invention.

FIG. 1 is a block diagram of an exemplary system for wireless data communication, which may be utilized in an embodiment of the invention. Referring to FIG. 1, there is shown an IBSS 102. The IBSS 102 comprises a WLAN station STA_A 112, a STA_B 114 and a STA_C 116. The STA_A 112 may communicate with the STA_B 114 via the RF channel 124, the STA_A 112 may communicate with the STA_C 116 via the RF channel 122 and the STA_B 114 may communicate with the STA_C 116 via the RF channel 126.

At any given time, each of the STAs may utilize a set of network parameters when communicating with other STAs within the IBSS 102. The timing for communication events may be determined based on a timing value generated by the TSF executing at the STA. For example, at a given time instant to, the STA_A 112 may utilize a set of network parameters, $NP\_A(t_0)$, the STA_B 114 may utilize a set of network parameters, $NP\_B(t_0)$ and the STA_C 116 may utilize a set of network parameters, $NP\_C(t_0)$. When the time instant to corresponds to a target beacon transmission time (TBTT), the time instant may mark the beginning of a time interval, referred to as a nominal beacon window, during which individual STAs may transmit beacon frames to other STAs within the IBSS. In various embodiments of the invention, the nominal beacon window length, BeaconWindowLength, may be represented as shown in the following equation:

$$\text{BeaconWindowLength} = 2 \cdot aCW\min * a\text{SlotTime} \quad [1]$$

where aCWmin refers to the lower bound on the upper end of the range from which a random number is selected for use in randomizing the start times of transmission attempts by STA in order to reduce the probability of a collision within a network where distributed medium access is employed and aSlotTime refers to a time duration, which may be sufficient to detect data transmitted via a wireless communication medium at a receiving STA.

Each STA within the IBSS may randomly select a time duration from the range of values between ZERO and the BeaconWindowLength time interval and waits for a duration of medium IDLE time to pass which is equal to that randomly selected value before transmitting a beacon frame. For example, assuming an idle medium, the STA_A 112 may transmit a beacon frame at a time instant $t_1$, which meets the following criteria:

$$t_0 \leq t_1 \leq t_0 + \text{BeaconWindowLength} \quad [2]$$

The beacon frame transmitted by the STA_A 112, $BF\_A(NP\_A(t_0), t_1)$, may comprise the set of network parameters $NP\_A(t_0)$ and a timestamp value equal to $t_1$, where the timestamp value may be based on a value, $TSF(A)\_val$, generated by the TSF executing at the STA_A 112.

The STA_B 114 may receive the beacon frame $BF\_A(NP\_A(t_0), t_1)$ via the RF channel 124. The STA 114 may compare the timestamp value of the received beacon frame, $t_1$, with the $TSF(B)\_value$, $TSF(B)\_val$, generated by the TSF executing at the STA_B 114. For purposes of exemplary exposition, the following condition may be assumed:

$$TSF(B)\_val < t_1 \quad [3]$$

Under the conditions set forth in equation [3], the STA_B may adopt the network parameters and timestamp value from the beacon frame $BF\_A(NP\_A(t_0), t_1)$. In this regard, after adopting the parameters contained within the received beacon frame $BF\_A(NP\_A(t_0), t_1)$ at STA_B 114:

$$TSF\_val(B) = t_1 \quad [4a]$$

$$NP\_B(t_1) = NP\_A(t_0) \quad [4b]$$

The STA_C 116 may receive the beacon frame $BF\_A(NP\_A(t_0), t_1)$ via the RF channel 122. The STA 116 may compare the timestamp value of the received beacon frame, $t_1$, with the $TSF(C)$ value, $TSF(C)\_val$, generated by the TSF executing at the STA_C 116. For purposes of exemplary exposition, the following condition may be assumed:

$$TSF(B)\_val > t_1 \quad [5]$$

Under the conditions set forth in equation [5], the STA_C may not adopt the network parameters and timestamp value from the beacon frame $BF\_A(NP\_A(t_0), t_1)$. In this regard, after receiving the beacon frame $BF\_A(NP\_A(t_0), t_1)$ at STA_C 116:

$$TSF\_val(B) = t_2 \quad [6a]$$

$$NP\_C(t_2) = NP\_C(t_0) \quad [6b]$$

where $t_2$ may represent the current TSF(C) value.

As presented in the exemplary discussion above, the TSF (B) at STA_B 114 may be time synchronized to the TSF(A) at STA_A 112, while the TSF(C) at STA_C 116 may not be time synchronized to either STA_A 112 or STA_B 114. Furthermore, the STA_A 112 and STA_B 114 may communicate within the IBSS 102 utilizing a common set of network parameters $NP\_A(t_0)$, the STA_C 116 may attempt to communicate with STA_A 112 and/or STA_B 114 while utilizing a different set of network parameters $NP\_C(t_0)$.

In various embodiments of the invention, the STAs within an IBSS 102 may adopt supervisory and subordinates roles. In this aspect of the invention, one of the STAs, for example STA 112, may be configured to be the supervisory STA, while the other STAs, for example STA_B 114 and STA_C 116, may be configured to be subordinate STAs.

In an exemplary embodiment of the invention, the supervisory STA_A 112 may compute a time increment value, TSF_inc, which may be added to the current value TSF_val (A). In this regard, $TSF\_val(A)$ may be represented as shown in the following equation:

$$TSF\_val\_mod(A) = TSF\_val(A) + TSF\_inc \quad [7]$$

The STA_A 112 may then transmit a beacon frame, which comprises the modified time value $TSF\_val\_mod(A) = t_{mod}$ and the current set of network parameters $NP\_A(t_{mod})$. The STA_A 112 then modifies its own TSF_val based on the TSF_val_mod value.

In various embodiments of the invention, the STA_B 114 may receive the beacon frame $BF\_A(NP\_A(t_{mod}), t_{mod})$ at a receive time $t_{R114}$, as determined by the TSF(B) at STA_B 114, where the value of the receive time $t_{R114}$ meets the following condition:

$$t_{mod} > t_{R114} \quad [8]$$

Under the condition set forth in equation [8], the STA_B 114 may adopt the network parameters and timestamp value from the beacon frame $BF\_A(NP\_A(t_{mod}), t_{mod})$. In this aspect of the invention, after adopting the parameters contained within the received beacon frame $BF\_A(NP\_A(t_{mod}), t_{mod})$ at STA_B 114:

$$TSF\_val(B) = t_{mod} \quad [9a]$$

$$NP\_B(t_{mod}) = NP\_A(t_{mod}) \quad [9b]$$

In addition, the STA_C 116 may receive the beacon frame BF_A(NP_A($t_{mod}$),$t_{mod}$) at a receive time $t_{R116}$, as determined by the TSF(C) at STA_C 116, where the value of the receive time $t_{R116}$ meets the following condition:

$$t_{mod} > t_{R116} \qquad [10]$$

Under the condition set forth in equation [10], the STA_C 116 may adopt the network parameters and timestamp value from the beacon frame BF_A(NP_A($t_{mod}$),$t_{mod}$). In this aspect of the invention, after adopting the parameters contained within the received beacon frame BF_A(NP_A($t_{mod}$),$t_{mod}$) at STA_C 116:

$$\text{TSF\_val}(C) = t_{mod} \qquad [11a]$$

$$\text{NP\_C}(t_{mod}) = \text{NP\_A}(t_{mod}) \qquad [11b]$$

Various embodiments of the invention comprise a method and system by which a STA_A 112 may be selected as a supervisory STA within an IBSS 102. The supervisory STA_A 112 may generate a modified time value, TSF_val mod(A), based on a current TSF value, TSF_val(A), and a computed time increment value TSF_inc. The modified time value may be utilized as a timestamp value within beacon frames transmitted by the supervisory STA_A 112. The modified time value may enable other stations within the IBSS 102, STA_B 114 and STA_C 116, to time synchronize to the supervisory STA_A 112. In addition, the other STAs within the IBSS 102, STA_B 114 and STA_C 116, may adopt the set of network parameters generated by the supervisory STA_A 112. In this aspect of the invention, each of the STAs within the IBSS 102 may communicate with other STAs by utilizing a consistent set of network parameters.

In various embodiments of the invention, the value of the computed time increment may be determined based on the estimated accuracy with which the TSF value is generated at any given STA relative to a determined nominal TSF value. In an exemplary embodiment of the invention, the current actual TSF value at a STA, $t_{act}$, may vary from the current nominal TSF value, $t_{nom}$, by an amount less than $\Delta t_{max}$. Thus, the minimum actual TSF value at a STA within the IBSS 102, min($t_{act}$), may be represented as shown in the following equation:

$$\min(t_{act}) > t_{min} - \Delta t_{min} \qquad [12a]$$

the value presented in equation [12a] may occur at a STA in which the TSF comprises a "slow" system clock. The maximum actual TSF value at a STA, max($t_{act}$), may be represented as shown in the following equation:

$$\max(t_{act}) < t_{nom} + \Delta t_{max} \qquad [12b]$$

the value presented in equation [12b] may occur at a STA in which the TSF comprises a "fast" system clock. Thus, the maximum time difference between a STA with a fast clock and a STA with a slow clock may be equal to $2 \cdot \Delta t_{max}$.

In various embodiments of the invention, the time increment value may be determined as shown in the following equation:

$$\text{TSF\_inc} \geq 2 \cdot \Delta t_{max} \qquad [13]$$

By utilizing the value TSF_inc as shown in equation [13], a selected supervisory STA_A 112, which comprises a slow system clock, may generate a modified value TSF_val_mod, which is greater than the value TSV_val generated at a STA, which comprises a fast system clock. In this aspect of the invention, the generation of the modified value TSF_val_mod enables a STA with a fast system clock to time synchronize to a selected supervisory STA with a slow system clock. This may enable STAs within an IBSS 102 to predictably, and consistently time synchronize to the selected supervisory STA, and to adopt the network parameters utilized by the selected supervisory STA. Thus, in various embodiments of the invention, STAs within an IBSS 102 may time synchronize to a common system clock, and may utilize a common set of network parameters when communicating within the IBSS 102.

In various embodiments of the invention, the time increment value may be represented as a function of the Beacon-Interval as shown in the following equation:

$$\text{TSF\_inc} \geq [2 \cdot (\% \text{ err}_{TSF}) \cdot \text{BeaconInterval}] \qquad [14]$$

where % $\text{err}_{TSV}$ represents the percentage error in the accuracy of the TSF within the STA over a BeaconInterval time interval. BeaconInterval is the nominal time between beacon transmissions.

In various embodiments of the invention, a supervisory STA may transmit a beacon frame during any time interval during which a beacon frame, and/or announcement traffic information message (ATIM) frames, may be transmitted. The supervisory STA may transmit the beacon frame even when the supervisory STA has already received a beacon frame from another STA within the IBSS. In various embodiments of the invention, a supervisory STA may reduce its BeaconWindowLength to a value which is less than the value $2 \cdot \text{aCWmin} \cdot \text{aSlotTime}$. This may enable the supervisory STA to transmit a beacon frame at a time instant within the nominal beacon, which window may precede a time instant at which any of the subordinate STAs may transmit a beacon frame.

In various embodiments of the invention, an IBSS 102 may comprise more than one STA, which is configured to perform the supervisory STA role. In this aspect of the invention, each STA, which is configured to perform the supervisory STA role, may be configured with a priority value. The priority value is transmitted within the beacon frame by a STA_A 112, which is contending for the supervisory STA role within the IBSS 102. A STA_C 116, which is also configured to perform the supervisory STA role, may inspect the priority value, priority_A, within the beacon frame received from the STA_A 112. The STA_C 116 may compare the configured priority value, priority_C, and the received priority value, priority_A. When priority_A>priority_C, the STA_C 116 may concede the supervisory STA role to the STA_A 112. In this aspect of the invention, the STA_C 116 may adopt a subordinate STA role relative to the STA_A 112. The STA_C 116 may then adopt the timestamp value and network parameter values contained within the received beacon frame. When priority_C>priority_A, the STA_C 116 may not concede the supervisory STA role to the STA_A 112. In this aspect of the invention, the STA_C 116 may not adopt a subordinate STA role relative to the STA_A 112. The STA_C 116 may not adopt the timestamp value and network parameter values contained within the received beacon frame.

When priority_A=priority_C, the STA_C 116 may then inspect the source address (SA) field in the received beacon frame. The SA field may comprise an organizational unique identifier (OUI) portion, and a non-OUI portion. The SA field may correspond to an address associated with the STA_A 112, which may have transmitted the beacon frame. In various embodiments of the invention, the STA_C 116 may compare the value of the OUI portion of the SA field, OUI(SA), and the OUI portion of the MAC address of STA_C, OUI (RCV_STA). When OUI(SA)>OUI(RCV_STA), the STA_C 116 may concede the supervisory STA role to the STA_A 112. When OUI(SA)<OUI(RCV_STA), the STA_C 116 may not concede the supervisory STA role to the STA_112.

When OUI(SA)=OUI(RCV_STA), the STA_C 116 may compare the value of the non-OUI portion of the SA field, nOUI(SA), to the non-OUI portion of the MAC address of STA_C, nOUI(RCV_STA). When nOUI(SA)>nOUI(RCV_STA), the STA_C 116 may concede the supervisory STA role to the STA_A 112. When nOUI(SA)<nOUI(RCV_STA), the STA_C 116 may not concede the supervisory STA role to the STA_112.

In various embodiments of the invention, a STA, which concedes the supervisory STA role, may not generate modified TSF values. In various embodiments of the invention, the priority value at a STA may be configured to be a determined value. In various embodiments of the invention, the priority value may be randomly generated at each STA.

Figure 2A:
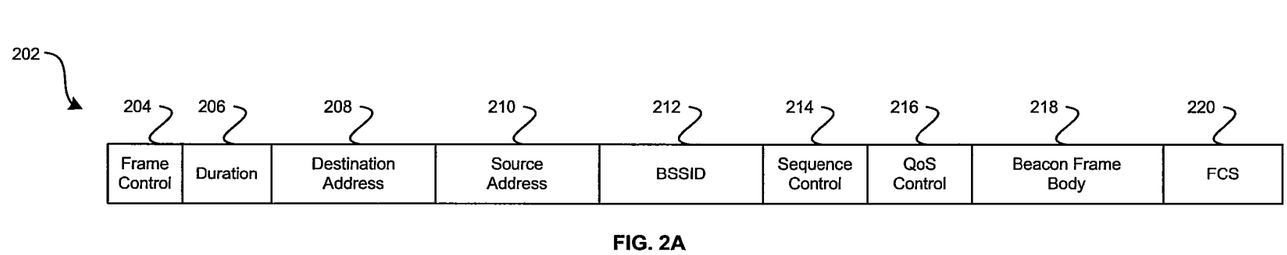
FIG. 2A is a block diagram for an exemplary beacon frame format, which may be utilized in an embodiment of the invention.

FIG. 2A is a block diagram for an exemplary beacon frame format, which may be utilized in an embodiment of the invention. With reference to FIG. 2A there is shown a beacon frame format 202. The beacon frame format 202 may comprise a frame control field 204, a duration field 206, a destination address field 208, a source address field 210, a BSSID field 212, a sequence control field 214, a QoS control field 216, a beacon frame body 218, and a frame check sequence (FCS) 220.

The frame control field 204 may comprise information that identifies the frame as being a beacon frame. The duration field 206 may comprise a value, which is computed based on the data rate at which the beacon frame 202 is transmitted. The destination address field 208 may identify one or more STAs, which are intended to receive the beacon frame 202. The source address field 210 may identify the STA, which transmitted the beacon frame 202. The BSSID field 212 may identify a BSS to which the beacon frame is being directed. The sequence control field 214 may be utilized to indicate whether the frame 202 is a segment within a larger beacon frame. The QoS control field 216 associates the beacon frame 202 with a designated traffic class, or traffic stream. The QoS control field 216 enables transport of the beacon frame 202 within the IBSS based on a QoS specification associated with the traffic class or traffic stream. The beacon frame body 218 may comprise information that is specific to a beacon frame. The FCS field 220 may be utilized to detect and/or correct bit errors in a beacon frame 202 received at an STA. In various embodiments of the invention, the beacon frame body 218 comprises a timestamp, a set of network parameters and/or a supervisory intent indication. The supervisory intent indication may enable a STA to communicate to other STAs, that the sender of the beacon frame is attempting to assert a supervisory STA role within the IBSS 102.

Figure 2B:
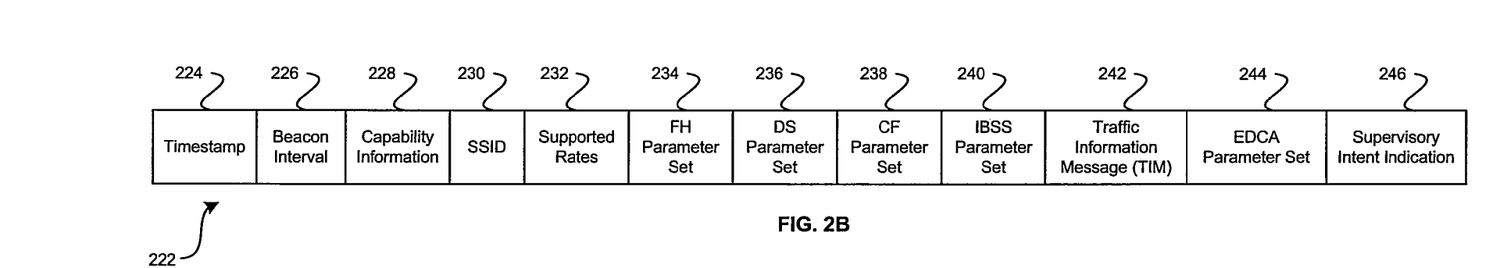
FIG. 2B is a block diagram for an exemplary beacon frame body format, which may be utilized in connection with an embodiment of the invention.

FIG. 2B is a block diagram for an exemplary beacon frame body format, which may be utilized in connection with an embodiment of the invention. With reference to FIG. 2B, there is shown a beacon frame body format 222. The beacon frame body format 222 may comprise a timestamp field 224, a beacon interval field 226, a capability information field 228, an SSID field 230, a supported rates field 232, a frequency hopping (FH) parameter set field 234, a direct sequence (DS) spread spectrum parameter set field 236, a contention free (CF) parameter set field 238, an independent BSS (IBSS) parameter set field 240, a traffic information message field 242 an enhanced distributed channel access (EDCA) parameter set field 244, and a supervisory intent indication field 246.

The timestamp field 224 may indicate a time instant at which the beacon frame was transmitted. The timestamp value inserted into the timestamp field 224 may be determined based on the TSF_val generated by the TSF executing at the STA, which is transmitting the beacon frame. The beacon interval field 226 may indicate the amount of time that may transpire between beacon frame transmissions. The value of the beacon interval field 226 may correspond to the BeaconInterval value The capability information field 228 may be used to communicate capabilities available at the AP, which is transmitting the beacon frame. The SSID field 230 may identify the ESS to which the beacon frame is being directed. The supported rates field 232 may indicate data rates that may be supported by the AP, which is transmitting the beacon frame. The FH parameter set field 234 may comprise information, which enables STAs receiving the beacon frame to utilize frequency hopping when communicating with the AP that is transmitting the beacon frame. The DS parameter set field 238 may comprise information, which enables RF channel assignment to STAs when communicating with the AP. The CF parameter set field 240 may comprise information, which enables contention free polling of STAs. The IBSS parameter set 240 may comprise information, which may be utilized by a STA within an IBSS. The TIM information element 242 comprises information, which may enable an AP to indicate to STAs that data is buffered at the AP for delivery to one or more STAs. The EDCA parameter set 244 may enable STAs to make policy-based decisions related to the acceptance of data from other STAs based on QoS criteria. The supervisory intent indication 246 may enable a STA within an IBSS 102 to communicate other STAs an intent to perform a supervisory STA role.

Figure 2C:
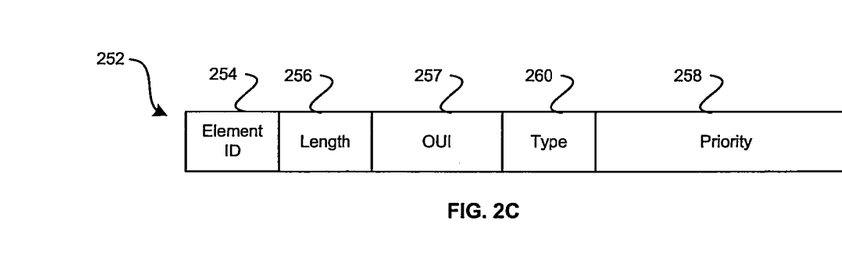
FIG. 2C is a block diagram for an exemplary supervisory intent indication information element, in accordance with an embodiment of the invention.

FIG. 2C is a block diagram for an exemplary supervisory intent indication information element, in accordance with an embodiment of the invention. With reference to FIG. 2C, there is shown a supervisory intent indication information element (IE) 252. The supervisory intent indication IE 252 may comprise an element identifier (ID) field 254, a length field 256, an organizationally unique identifier (OUI) field 257, a type field 260 and a priority field 258. The element ID field 254 may identify the IE 252 as comprising vendor-specific information. The length field 256 may specify the combined length of the OUI field 257, the type field 260 and of the priority field 258. In various embodiments of the invention, the supervisory intent indication IE 252 is a vendor-specific IE. The vendor may be identified based on the OUI field 257. The type field 260 may be utilized in conjunction with the OUI field 257 to identify the IE type as being a supervisory intent indication IE 252. The priority field 258 may specify a priority level. The priority field 258 may enable resolution of supervisory STA and subordinate STA roles among a plurality of STAs within an IBSS 102, which are attempting to assert a supervisory STA role.

Figure 3:
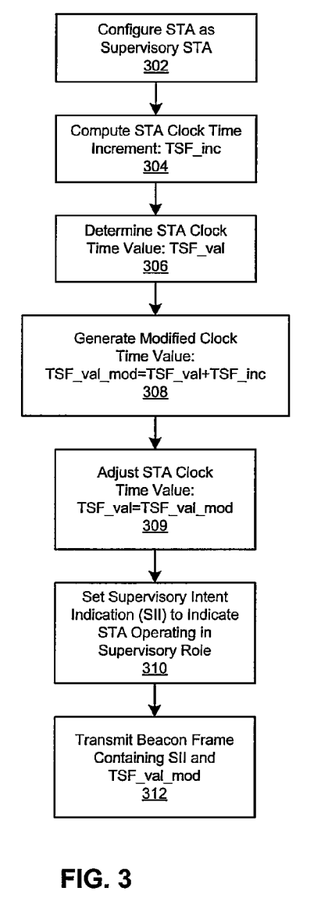
FIG. 3 is a flowchart illustrating exemplary steps for transmitting a beacon frame from a supervisory WLAN station in an independent basic service set, in accordance with an embodiment of the invention.

FIG. 3 is a flowchart illustrating exemplary steps for transmitting a beacon frame from a supervisory WLAN station in an independent basic service set, in accordance with an embodiment of the invention. Referring to FIG. 3, in step 302, the STA_A 112 may be configured as a supervisory STA 302. This may comprise generation of a priority value, priority_A. In step 304, the STA_A 112 may compute a clock time increment value, TSF_inc. An exemplary TSF_inc value may be computed as shown in equation [14]. In step 306, the STA_A 112 may determine the STA clock time value, TSF_val, generated by the TSF executing at the STA_A 112. In step 308, the STA 112 may generate a modified clock value TSF_val_mod. An exemplary TSF_val_mod value may be computed by adding the current TSF_val and the TSF_inc value. In step 309, the STA clock time value, TSF_val, is adjusted based on the modified clock time value TSF_val_mod. In step 310, the STA_A 112 may set the supervisory intent indication (SII) to indicate that the STA_A 112 is operating in a supervisory role. In step 312, the STA_A 112 may transmit a beacon frame containing the SII and the TSF_val.

Figure 4:
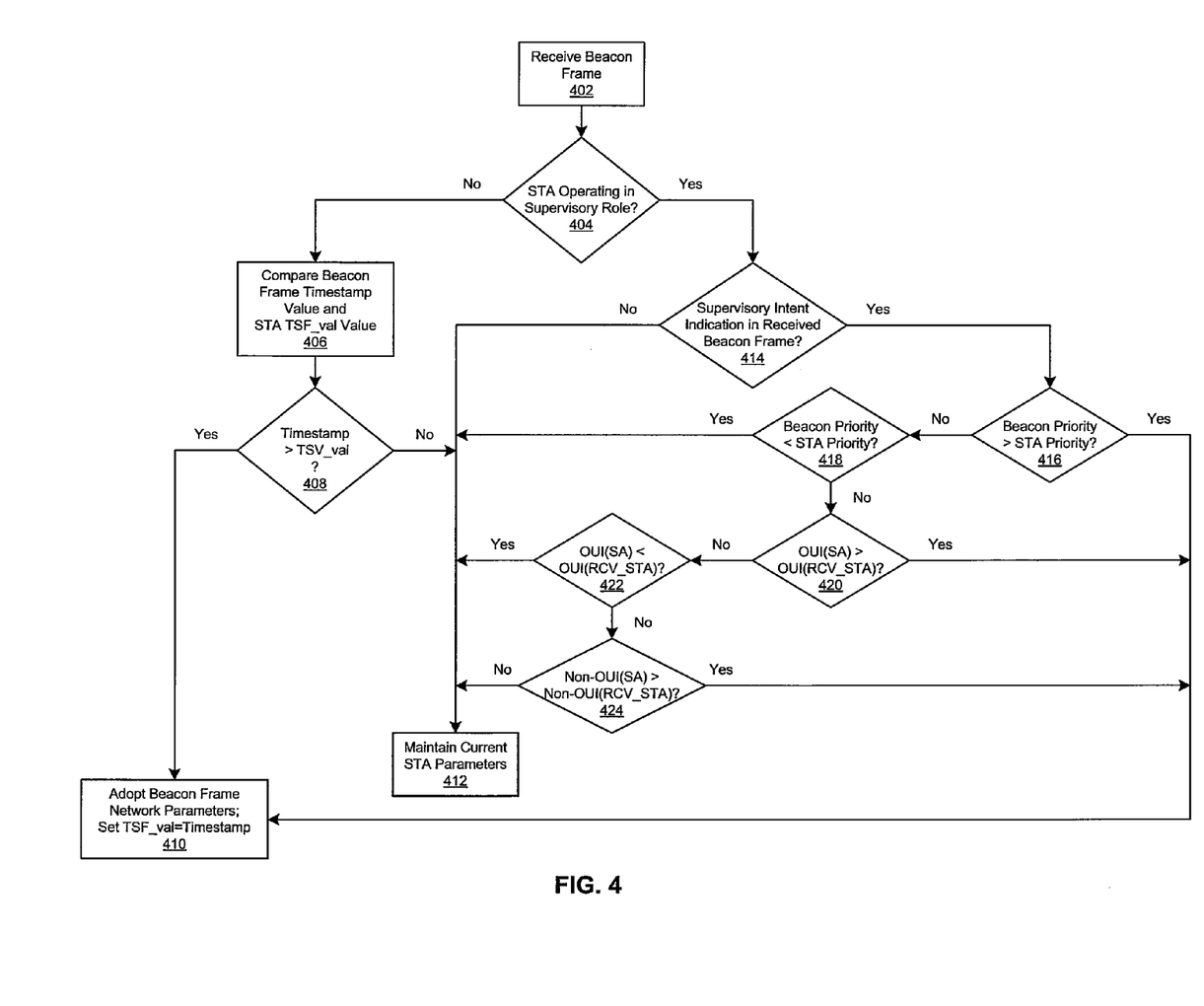
FIG. 4 is a flowchart illustrating exemplary steps for receiving a beacon frame at a WLAN station in an independent basic service set, in accordance with an embodiment of the invention.

FIG. 4 is a flowchart illustrating exemplary steps for receiving a beacon frame at a WLAN station in an independent basic service set, in accordance with an embodiment of the invention. Referring to FIG. 4, in step 402, a STA_B 114 may receive a beacon frame. In step 404, the STA_B 114 may determine whether it is configured to operate in a supervisory role. When the STA_B 114 is not configured to operate in a supervisory role, in step 406, the STA_B 114 may compare the timestamp value, contained within the timestamp field 224 of the received beacon frame 202, to the TSF_val value generated by the TSF executing at the STA_B 114. Step 408 may determine whether the timestamp field 224 value is greater than the TSF_val value. When the timestamp field 224 value is greater than the TSF_val value, in step 410, the STA_B 114 may adopt the network parameters contained within the beacon frame. In addition, the STA_B 114 may time synchronize to the STA, which transmitted the beacon frame by setting the TSF_val to the timestamp field 224 value.

When step 408 determines that the timestamp field 224 value is not greater than the TSV_val value, in step 412, the STA_B 114 may maintain current STA parameters. The parameters maintained may include the TSV_val time value and various network parameters utilized by the STA_B 114 to enable communication with other STAs within the IBSS 102.

When step 404 determines that the STA_B 114 is configured to operate in a supervisory role, step 414 may determine whether the received beacon frame 202 contains a supervisory intent indication 246. When step 414 determines that the received beacon frame does not contain a supervisory intent indication, step 412 may follow and the STA_B 114 may maintain current STA parameters.

When step 414 determines that the received beacon frame does contain a supervisory intent indication, step 416 may determine whether the value of the priority field 258 within the beacon frame 202 is greater than the priority value configured at the STA_B 114. When, in step 416, the STA_B 114 determines that the beacon frame 202 contains the higher priority value, in step 410, the STA_B 114 may adopt the network parameters contained within the beacon frame. In addition, the STA_B 114 may time synchronize to the STA, which transmitted the beacon frame by setting the TSF_val to the timestamp field 224 value.

When step 416 does not determine that the beacon frame priority value is greater than the STA_B 114 priority value, step 418 may determine whether the value of the priority field 258 is less than the priority value configured at the STA_B 114. When step 418 determines that the value of the priority field 258 is less than the priority value configured at the STA_B 114, step 412 may follow.

When step 418 determines that the value of the priority field 258 is equal to the priority value configured at the STA_B 114, step 420 may determine whether the value of the OUI portion of the SA 210 is greater than the value of the OUI portion of the MAC address of the receiving STA. When step 420 determines that the OUI portion of the SA 210 is greater than the value of the OUI portion of the MAC address of the receiving STA, step 410 may follow.

When step 420 does not determine that the OUI portion of the SA 210 is greater than the value of the OUI portion of the MAC address of the receiving STA, step 422 may determine whether the OUI portion of the SA 210 is less than the value of the OUI portion of the MAC address of the receiving STA. When step 422 determines that the OUI portion of the SA 210 is less than the value of the OUI portion of the MAC address of the receiving STA, step 412 may follow.

When step 422 determines that the OUI portion of the SA 210 is equal to the value of the OUI portion of the MAC address of the receiving STA, step 424 may determine whether the non-OUI portion of the SA 210 is greater than the value of the non-OUI portion of the MAC address of the receiving STA. When step 424 determines that the non-OUI portion of the SA 210 is greater than the value of the non-OUI portion of the MAC address of the receiving STA, step 410 may follow. When step 424 determines that the non-OUI portion of the SA 210 is not greater than the value of the non-OUI portion of the MAC address of the receiving STA, step 412 may follow.

Aspects of an exemplary system for an ad hoc wireless network with master control of network parameters may comprise one or more circuits that enable generation of a beacon frame at a supervisory STA_A 112 wherein the generated beacon frame contains a supervisory role indication, which enables the supervisory STA_A 112 to establish timing synchronization and network parameters that are utilized by a plurality of WLAN stations utilized for communicating within an IBSS 102. The plurality of communicating devices may comprise the supervisory STA_A 112 and at least one subordinate STA_B 114. The WLAN may be an IBSS as defined by IEEE 802.11 standards. The beacon transmission time interval, BeaconInterval, may indicate the time duration between the start of transmission of a current beacon frame at the STA_A 112, and the start of transmission of a succeeding beacon frame. The STA_A 112 may compute a time increment value, TSF_inc, based on the BeaconInterval value and a percentage error in a system clock time value, % err$_{TSF}$. The STA_A 112 may compute a timestamp value, TSF_val_mod based on the TSF_inc value and the TSF_val value generated by a TSF executing on behalf of the STA_A 112. The STA_A 112 may modify the system clock time value TSF_val value based on the computed TSF_val_mod. The TSF may generate subsequent system clock time values based on the modified TSF_val. The generated beacon frame may comprise the computed timestamp value TSF_val_mod.

The supervisory role indication may comprise a priority value. The beacon frame may be transmitted during a time instant that occurs during a beacon transmission time window. The duration of the beacon transmission time window may be determined based on the minimum contention window time duration, aCWmin. At the supervisory STA_A 112, the duration of the beacon transmission time window may be determined based on a value that is less than aCWmin.

Aspects of the system may also comprise a STA_B 114 that enables communication via an IBSS 102 by utilizing a timestamp value and network parameter values retrieved from a received beacon frame based on the presence of a supervisory role indication within the received beacon frame. The STA_B 114 may determine whether it is configured to operate in a supervisory role. The STA_B 114 may determine whether a configured priority value is greater than, less than or equal to, a beacon priority value retrieved from the received beacon frame. The timestamp value and network parameter values may be utilized by the STA_B 114 when the beacon priority value is greater than the station priority value. The STA_B 114 may determine whether an OUI portion of the source address (SA) is greater than, less than or equal to, an OUI portion of the MAC address of STA_B 114. The timestamp value and network parameter values may be utilized by the STA_B 114 when the beacon priority value is equal to the station priority value and the OUI portion of the SA is greater than the MAC address of STA_B 114. The STA_B 114 may determine whether a non-OUI portion of the SA is greater than, less than or equal to, a non-OUI portion of the MAC address of STA_B 144. The timestamp value and network parameter values may be utilized by the STA_B 114 when the beacon priority value is equal to the station priority value, the OUI portion of the SA is equal to the OUI portion of the MAC address of STA_B 144 and the non-OUI portion of the SA is greater than the non-OUI portion of the MAC address of STA_B 144.

Another embodiment of the invention may provide a machine-readable storage, having stored thereon, a computer program having at least one code section executable by a machine, thereby causing the machine to perform the steps as described herein for an ad hoc wireless network with master control of network parameters.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communicating data, the method comprising:
    communicating via a wireless network by utilizing a timestamp value and network parameter values determined from a received beacon frame based on the presence of a supervisory role indication within one or more fields in said received beacon frame, wherein said received beacon frame comprises one or more additional fields comprising timing synchronization information;
    determining whether a communicating device that receives said beacon frame is configured to operate in a supervisory role;
    determining whether a station priority value configured at said communicating device is greater than, less than or equal to, a beacon priority value determined from said received beacon frame;
    determining whether a first portion of a source address determined from said received beacon frame is greater than, less than or equal to, a first portion of a station address for said communicating device when said beacon priority value is equal to said station priority value; and
    utilizing said timestamp value and said network parameter values when said first portion of said source address is greater than said first portion of said station address.

2. The method for communicating data according to claim 1, the method comprising:
    determining whether a second portion of said source address determined from said received beacon frame is greater than, less than or equal to, a second portion of said station address when said first portion of said source address is equal to said first portion of said station address.

3. The method for communicating data according to claim 2, the method comprising:
    utilizing said timestamp value and said network parameter values when said second portion of said source address is greater than said second portion of said station address.

4. A method for communicating data, the method comprising:
    receiving a frame comprising a destination address, a source address, a plurality of network parameter values, a timestamp and a beacon priority value;
    comparing a station priority value to the beacon priority value;
    if the beacon priority value is greater than the station priority value, adopting the timestamp value and the plurality of network parameter values from the frame;
    if the beacon priority value is equal to the station priority value, adopting the timestamp value and the plurality of network parameter values from the frame based on the comparison of at least a portion of the destination address to at least a portion of the source address.

5. The method for communicating data according to claim 4, wherein the frame is generated by a supervisory communicating device in a wireless network.

6. The method for communicating data according to claim 4, wherein the frame is a beacon frame that enables timing synchronization.

7. The method for communicating data according to claim 4, wherein the frame comprises a supervisory role indication associated with the beacon priority value.

8. The method for communicating data according to claim 4, wherein the frame is received by a subordinate communicating device.

9. The method for communicating data according to claim 4, wherein the timestamp value is based on a time increment value and a current system clock time value generated by a time synchronization function.

10. The method for communicating data according to claim 4, wherein the timestamp value and the plurality of network parameter values are adopted from the frame, if the beacon priority value is equal to the station priority value and a first portion of the destination address is less than a first portion of the source address.

11. A system for communicating data, the system comprising:
    a processor operable to:
        receive a frame comprising a destination address, a source address, a plurality of network parameter values, a timestamp and a beacon priority value;

compare a station priority value to the beacon priority value;

adopt the timestamp value and the plurality of network parameter values from the frame, if the beacon priority value is greater than the station priority value or if the beacon priority value is equal to the station priority value and at least a portion of the source address is greater than at least a portion of the destination address.

12. The system for communicating data according to claim 11, wherein the processor is part of a subordinate communicating device in a wireless network.

13. The system according to claim 12, wherein the wireless network is an independent basic service set defined by IEEE 802.11 standards.

14. The system for communicating data according to claim 11, wherein the frame is generated by a supervisory communicating device in a wireless network.

15. The system for communicating data according to claim 11, wherein the frame is a beacon frame that enables timing synchronization.

16. The system for communicating data according to claim 11, wherein the frame comprises a supervisory role indication associated with the beacon priority value.

17. The system for communicating data according to claim 11, wherein the timestamp value is based on a time increment value and a current system clock time value generated by a time synchronization function.

18. The system for communicating data according to claim 11, wherein the processor is part of a communicating device in a wireless network.

19. The system for communicating data according to claim 17, wherein the communicating device assumes a supervisory role if the timestamp value and the plurality of network parameter values are not adopted from the frame.

20. The system for communicating data according to claim 17, wherein the communicating device assumes a supervisory role if the beacon priority value is less than the station priority value.

* * * * *